(12) United States Patent
Phang

(10) Patent No.: US 9,150,766 B2
(45) Date of Patent: Oct. 6, 2015

(54) MOISTURE ABSORBING ANTI-FOG COMPOSITION AND PROCESS FOR THE USE THEREOF

(71) Applicant: ILLINOIS TOOL WORKS, INC., Glenview, IL (US)

(72) Inventor: Tze Lee Phang, Katy, TX (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 106 days.

(21) Appl. No.: 13/833,379

(22) Filed: Mar. 15, 2013

(65) Prior Publication Data

US 2014/0044869 A1 Feb. 13, 2014

Related U.S. Application Data

(60) Provisional application No. 61/681,322, filed on Aug. 9, 2012.

(51) Int. Cl.
*C09K 3/18* (2006.01)
*C09D 133/02* (2006.01)

(52) U.S. Cl.
CPC .............. *C09K 3/18* (2013.01); *C09D 133/02* (2013.01)

(58) Field of Classification Search
CPC .................................. C09K 3/18; C09D 133/02
USPC ............................ 524/556; 523/169; 427/162
See application file for complete search history.

(56) References Cited

U.S. PATENT DOCUMENTS

| 3,299,112 | A | * | 1/1967 | Bailey ........................ 556/445 |
| 3,933,407 | A | | 1/1976 | Tu et al. |
| 5,976,680 | A | | 11/1999 | Ikemori et al. |
| 6,287,683 | B1 | * | 9/2001 | Itoh et al. .................... 428/336 |
| 6,296,694 | B1 | * | 10/2001 | Miller .......................... 106/13 |
| 6,394,613 | B1 | | 5/2002 | Hatakeyama et al. |

FOREIGN PATENT DOCUMENTS

| EP | 0770658 | 5/1997 |
| WO | 0123510 | 4/2001 |
| WO | 2011090156 | 7/2011 |

* cited by examiner

*Primary Examiner* — James J Seidleck
*Assistant Examiner* — Deve E Valdez
(74) *Attorney, Agent, or Firm* — Avery N. Goldstein, Esq.; Blue Filament Law, PLLC

(57) ABSTRACT

An anti-fog composition is provided that includes a superabsorbent polymer that along with a wetting agent are dissolved in a solvent. The superabsorbent polymer excludes hydroxylated acrylate and methacrylate polymers. The composition upon being applied to a substrate with the excess composition removed, an anti-fog film is formed on the substrate without resort to heat treatment and vacuum processing or other complex application processes associated with. The composition is well suited for formation of an end user kit for applying such a film to a substrate. Such a kit includes a container for the composition or a wipe wet with the composition. The container being a bottle or a propellant filled aerosol canister. Upon wiping residual composition from the substrate, the anti-fog film is produced without resort to prior art and complex application processes.

17 Claims, No Drawings

MOISTURE ABSORBING ANTI-FOG COMPOSITION AND PROCESS FOR THE USE THEREOF

RELATED APPLICATIONS

This application is a non-provisional application that claims priority benefit of U.S. Provisional Application Ser. No. 61/681,322 filed Aug. 9, 2012; the contents of which are hereby incorporated by reference.

FIELD OF THE INVENTION

The present invention in general relates to a composition to inhibit fogging and process for the use thereof and in particular, to such a composition amenable to application to a substrate in field operation to prevent fog condensation on a substrate.

BACKGROUND OF THE INVENTION

The nucleation of water droplets on a substrate from ambient atmosphere poses an ongoing problem for viewing and vehicle operation under high humidity conditions. The operation of automobiles, spacecraft, and aircraft are all compromised by poor visibility associated with fog condensation on a viewing substrate of such vehicles and craft. Other transparent viewing surfaces also exhibit diminished performance as a result of droplet nucleation on such surfaces. These other surfaces include glasses, goggles, camera lenses, and binoculars. Additionally, with unmanned aerial vehicles and underwater craft proliferating, concerns about visual impairment associated with condensation on viewing substrates in such unmanned vehicle has become an increasingly urgent problem.

Traditionally, for preventing fog on various substrates, a method of coating a surface with a surfactant that has wetting property is generally used. The duration of the anti fog effect by using this method is limited and regular re-application is required. Moreover, the performance under high humidity conditions is not good because the surfactant cannot hold a large amount of water that condensed on the surface. Hence, the conventional anti-fog develops rivulets of water and has a streaked transparency.

More recently, the field has learned to appreciate that substrate fogging can be inhibited by coating a substrate with a water-absorbing material, as opposed to a surfactant that simply modifies the wetting properties of a substrate. Water absorbing materials that have been used include starch-based polymers, cellulose-based polymers, polyvinyl alcohol-based polymers, acrylic polymers, and polyether-based polymers. The use of these water absorbing polymers has extended the duration of an anti-fog effect relative to surfactant-based compositions. Water absorbing material deposition techniques for an anti-fog film include reliance on heat treatment (U.S. Pat. No. 5,976,680), vacuum processes (U.S. Pat. No. 6,287,683), and dip-, spray-, or spin-coating (U.S. Pat. No. 6,394,613). A characteristic common to these anti-fog film deposition techniques is the inclusion of two or more treatment steps to apply an anti-fog film. Additionally, these techniques require a catalyst needed to crosslink the polymer into a final film, heat treatment to temperatures of greater than 80° C., vacuum process or the necessity to remove the substrate from the substrate mounting in order to perform the dip coating, spray coating or spin coating to achieve an optically smooth anti-fog film, or combinations of these processes. As a result of these limitations associated with prior art techniques for applying a water-absorbing material containing anti-fog film onto a substrate, the ability to reapply such an anti-fog composition while a substrate is in field use is severely hampered.

Thus, there exists a need for a moisture absorbing anti-fog composition and a process for the use thereof that is readily applied in the field to a substrate through resort to the conventional trigger spray application, propellant aerosol, or a sponge or cloth for wipe application onto the substrate desired to have an anti-fog film thereon. There also exists a need for a process to apply such a composition from a kit to provide an anti-fog film on a substrate.

SUMMARY OF THE INVENTION

An anti-fog composition is provided that includes a superabsorbent polymer that along with a wetting agent are dissolved in a solvent. The superabsorbent polymer excludes hydroxylated acrylate and hydroxlated methacrylate polymers. The composition upon being applied to a substrate, then removing the excess composition removed to form an anti-fog film on the substrate without resort to heat treatment and vacuum processing or other complex application processes associated with. The composition is well suited for formation of an end user kit for applying such a film to a substrate. Such a kit includes a container for the composition or a wipe wet with the composition. The container being a bottle or a propellant filled aerosol canister. Upon wiping residual composition from the substrate, the anti-fog film is produced without resort to prior art and complex application processes.

DETAILED DESCRIPTION OF THE PREFERRED EMBODIMENTS

The present invention has utility as an anti-fog composition that forms a film on a substrate to inhibit water droplet nucleation on the film and the underlying substrate. The present invention has the attribute of being amenable to application as a wipe-on or spray applied composition that forms a film without resort to the complex deposition processes that characterized prior art systems. A kit is provided with such a composition along with instructions for end user field application of the inventive composition to a substrate so as to impart an anti-fog film thereto. Owing to the ability to apply an anti-fog film according to the present invention in the field, an inventive composition is readily applied repeatedly in the field as anti-fog attributes of a previously applied film degrade. An inventive composition is also amenable to formulation independent of, and therefore devoid of volatile organic compounds (VOCs).

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive anti-fog composition includes at least one superabsorbent polymer. As used herein "superabsorbent polymer" is defined as a synthetic or naturally occurring polymer able to absorb at least 5 times the weight of the superabsorbent polymer in water. Typical water absorption of superabsorbent polymers is between 5 and 350 times the weight of the superabsorbent polymer. Water soluble polymers and copolymers operative herein as superabsorbent polymers include acrylates, acrylonitrile, methacrylonitrile, vinyl alcohol, vinyl acetates, vinylpyrrolidones, maleic acid anhydride, itaconic acid anhydride, fumaric acid, vinylsulfonic acid and the salts, amides, N-$C_1$-$C_6$ alcohol derivatives, N-N-dialkyl $C_1$-$C_6$ derivatives, and copolymers containing these monomeric groups. Additionally, it is appreciated that superabsorbent polymers operative herein include naturally occurring substances and those based on naturally occurring substances that illustratively include guar gum, carboxymethylcellulose, xanthan, alginates, gum aerobic, hydroxyethylcellulose, hydroxypropylcellulose, methylcellulose, starch and modified starches such as potato and tapioca. Cationic salts of such superabsorbent polymers are particularly preferred. Cations operative herein illustratively include ammonium, lithium, sodium, potassium, magnesium, and calcium. Without intending to be bound by a particular theory, it is believed that ionic superabsorbent polymers promote solubility in water and polar organic solvents while also interacting with charge groups associated with conventional substrate surfaces such as silicate glasses and static charged polymeric substrates. It is appreciated that more than one superabsorbent polymer is readily present in an inventive composition to adjust viscosity, and anti-fog film formation properties. It is further appreciated that through modification of the molecular weight of the superabsorbent polymer used herein with cross-linked densities of between 1 and 5 crosslinkages for a given polymer molecule that roughly corresponds to a molecular weight between cross linkages and a polymer of between 1,000 and 1,000,000. An inventive superabsorbent polymer specifically excludes hydroxyalkyl acrylates and hydroxyalkyl methacrylates owing to undesirable film formation properties. A superabsorbent polymer operative herein is typically present from 0.1 to 10 total weight percent and preferably from 0.2 to 3 total weight percent.

While not intending to be bound to a particular theory, a wetting agent is provided the render the surface hydrophilic by forming a hydrophilic film thereon. The hydrophilic film having anti-fog properties. The wetting agent film can only hold a limited amount of water, vapor that condenses thereon, water rivulets will form. These rivulets tend to wash away the wetting agent film. Hence, composition just based on wetting agent (or a traditional surfactant) has limited durability, especially under high humidity conditions. This limitation is addressed in the present invention by the inclusion of the superabsorbent polymer, which can absorb many times the SAP mass in water, to minimize the wetting agent (or traditional surfactant) being washed away by the water streams thereby improving the durability of the present invention over the prior art. Wetting agents operative herein illustratively include methyl (propoxylhydroxide, ethoxylated) bis(trimethylsiloxy silane), siloxane polyalkynleneoxide copolymer, siloxane polyether copolymer, polydimethyl siloxane polyethylene, oxide-propyleneoxide copolymer, polydimethyl siloxane silicone fluid, polyalkyleneoxide modified heptamethyltrisiloxane fluorinated alkylalkoxylate fluorocarbon telomere B monoether with polyethylene glycols, ethoxylated tetramethyl decanediol and combinations thereof. Organosiloxane-oxyalkylene block copolymers is operative herein as described for example in U.S. Pat. Nos. 3,933,407; and 3,299,112. It should be appreciated that each of the above wetting agents is commercially available in at least one form. In order to achieve misibility with the inventive solvent and impart desirable properties to the resultant anti-fog film applied to the substrate, a wetting agent typically has a molecular weight of between 500 and 20,000 and preferably between 800 and 10,000. In specific embodiments, an inventive composition is devoid of inorganic alkoxide compounds in the presence of the wetting agent siloxanes, silanes, or a combination thereof associated with the present invention A wetting agent operative herein is typically present from 0.1 to 20 total weight percent and preferably from 0.2 to 10 total weight percent. It is appreciated that the specific amount of a wetting agent as used herein depends on factors including wetting agent molecular weight, Hansen solubility parameter, and superabsorbent polymer loading.

The superabsorbent polymer and wetting agent are dissolved or suspended in a solvent system that includes water and a miscible organic solvent. The organic solvent is typically present in a weight ratio relative to water of from 0.01-0.8:1. Organic solvents operative herein illustratively including $C_1$-$C_4$ alcohols, acetone, ($C_1$-$C_4$)—O—($C_1$-$C_4$), ethylene glycol butyl ether, dipropylene glycol methyl ether, and combinations thereof. Preferably, the solvent system is 80-99 percent by weight of an inventive composition. Preferably, the organic solvent is VOC exempt. As used herein, "VOC" is defined as a compound listed on the United States Environmental Protection Agency Master List of Volatile Organic Compounds.

An inventive composition optionally includes a hydrophilic surfactant. Hydrophilic surfactants operative herein illustratively include nonionic polymeric fluorinated surfactants, anionic phosphonated fluorinated surfactants, nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate.

An inventive composition optionally includes a halocarbon or hydrocarbon propellant in instances when an aerosol delivery system of an inventive composition is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant formulation inclusive of a propellant is sealed within a conventional metal aerosol canister and applied by spray application as is conventional to the art.

An inventive composition also includes various additives to enhance a property of an inventive composition; the property illustratively including storage stability, film formation, film durability and cleaning properties. Other additives operative herein optionally include alone or in combination hydrophilic film plasticizers, biocides, cleaning solvents, light stabilizers, defoamers, and corrosion inhibitors.

A hydrophilic film plasticizer operative herein illustratively includes Hydroxyethylpyrrolidone.

A biocide operative herein illustratively includes Neolone M-10, Kathon CG-ICP & II, Proxel GXL, Koralone B-119 and Nuosept 44.

A substrate cleaning solvent operative herein illustratively includes methanol, ethanol, isopropyl alcohol, acetone, ethylene glycol butyl ether, and dipropylene glycol methyl ether.

An inventive composition optionally includes a defoaming agent in an amount present to inhibit blister formation in anti-fog film so produced from an inventive composition. Defoamer agents operative herein illustratively include silicone-based defoamers; mineral oil-based defoamers, and mixtures of foam destroying polymers and hydrophobic solids such as polyurias, as are known to the art. Specific exemplary silicone-based defoamers illustratively include silica-filled polydimethyl siloxane and polyether-modified polysiloxanes.

A light stabilizer operative herein illustratively includes Tinuvin 292.

A corrosion inhibitor operative herein illustratively includes sodium benzoate, triethanolamine dinonylnaphthalene, boric acid-triethanolamine salt, phosphoric acid-triethanolamine salt, ammonia, triethanolamine, capryloamphoprionate, and mixtures thereof.

While it should be appreciated that there is virtually no limit as to the nature of a substrate to which an inventive composition is applied to as to form an anti-fogging film, with the proviso that the substrate is not dissolved or otherwise damaged through exposure to an inventive composition, exemplary substrates that are exposed to environmental conditions in which water droplet nucleation can occur on the substrate and having optical transmission attributes in their usage illustratively include optically transparent or translucent substrates formed of polystyrene, polycarbonate, polymethyl methacrylate, quartz glasses, silicate glasses, and ceramics.

Typical and preferred compositions according to the present inventions are provided in Table 1.

TABLE 1

Inventive Composition (amounts in total weight percent exclusive of optional propellant)

| Ingredient | Typical | Preferred |
|---|---|---|
| Superabsorbent polymer | 0.1-10 | 0.2-3 |
| Wetting agent | 0.1-20 | 0.2-10 |
| Surfactant | 0-5 | 0.1-3 |
| Plasticizer | 0-5 | 0-1 |
| Biocide | 0-1 | 0-0.5 |
| Cleaning solvent | 0-10 | 0-5 |
| Light stabilizer | 0-1 | 0-0.2 |
| Defoamer | 0-1 | 0.01-0.5 |
| Corrosion inhibitor | 0-2 | 0-1 |
| Solvent system | to 100% | to 100% |
| Organic: water 0.01-0.8:1 | | |

An inventive composition is readily provided as a kit in the form of a bottle or aerosol canister. The bottle optionally equipped with a pump- or spray-trigger. With the provision of an optional wipe remove excess composition, along with instructions for doing so, an inventive kit is operational. The instructions providing details as how to prepare a substrate, apply the inventive composition, removal of excess from the substrate and the time and properties of the anti-fog film so applied. The instructions can also provide details as to how the composition is re-applied after an applied film is worn.

The present invention is further detailed with respect to the following non-limiting examples that are provided to further illustrate the preparation of specific inventive compositions and certain attributes associated with the resulting films on substrates.

EXAMPLE 1

To 82.7 grams of deionized water is added 10 grams of isopropanol, 5 grams of ethylene glycol butyl ether, and 1 gram of sodium polyacrylate having a mean molecular weight of 3,500-. 1 gram of sodium polyacrylate is added as a wetting agent upon mixing additional water is added to bring the total weight to 100 grams. The resulting formulation is applied to the surface of a borosilicate glass. The substrates were exposed to hot water durability test. In this test, the coated glass panel is put on top of a 500 mL of beaker containing 200 mL of hot water at 55° C. for 30 s. The substrate is then removed from the beaker for 5 min. No appreciable water condensation was noted on the substrate surfaces having an inventive film thereon. Then, the test is repeated by putting the glass panels on the beaker for 30 s and is then removed from the beaker for 5 min. This is to simulate high humidity conditions with the fogging repeated at daily intervals. The inventive composition provided a continued anti-fog effect for longer than 14 repeated steps, longer than the traditional anti-fog, which fog after 5 repeated steps.

EXAMPLE 2

The composition of Example 1 is reformulated with isopropanol constituting 18 total weight percent at the expense of a like amount of deionized water. The resultant composition has a similar performance to that of Example 1 initially, and over time.

EXAMPLE 3

The composition of Example 1 is reformulated with a like molecular weight vinyl alcohol at the expense of a like amount of polyacrylate. The resultant composition has a similar performance to that of Example 1 initially, and over time.

EXAMPLE 4

The composition of Example 3 is presoaked into a synthetic fabric wipe and upon ringing excess liquid from the wipe, the wipe is applied to a substrate surface. The substrate surface is wiped dry with a clean and dry synthetic towelette. The resulting film forms as detailed above with respect to Example 1.

EXAMPLE 5

The composition of Example 3 is sealed in a conventional metal aerosol canister with gaseous nitrogen as a propellant. The canister mixture is applied by spray application to the same substrates as Example 1 with excess liquid being removed from the substrate surface. The resulting film coated substrates are tested and perform in a similar manner as to those in Example 1.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. An anti-fog composition comprising:
   a superabsorbent polymer; with the proviso that said superabsorbent polymer is not a hydroxyalkyl acrylate or hydroxymethacrylate or hydroxy alkoxyalkylacrylate or hydroxy alkoxymethacrylate;
   a wetting agent;
   a hydrophilic film plasticizer; and
   a hydrophilic solvent system comprising water and a miscible organic solvent, in which said superabsorbent polymer, said plasticizer, and said wetting agent are dissolved.

2. The composition of claim 1 wherein said superabsorbent polymer is a sodium polyacrylate.

3. The composition of claim 1 wherein said superabsorbent polymer is at least one of: acrylates, acrylonitrile, methacrylonitrile, vinyl acetates, vinylpyrrolidones, vinyl alcohol. maleic acid anhydride, itaconic acid anhydride, fumaric acid, vinylsulfonic acid and the salts, amides, $N-C_1-C_6$ alcohol derivatives, N-N-dialkyl $C_1-C_6$ derivatives, and copolymers containing an aforementioned monomeric group.

4. The composition of claim 1 wherein said superabsorbent polymer has a superabsorbent polymer weight and is able to absorb at least 5 times the superabsorbent polymer weight.

5. The composition of claim 1 wherein said wetting agent is a polymeric silane or a polymeric siloxane.

6. The composition of claim 5 wherein said wetting agent is at least one of methyl (propoxylhydroxide, ethoxylated) bis (trimethylsiloxy silane), siloxane polyalkynleneoxide copolymer, silo xane po lyether copolymer, polydimethyl siloxane polyethylene, oxide-propyleneoxide copolymer, polydimethyl siloxane silicone fluid, polyalkyleneoxide modified heptamethyltrisiloxane fluorinated alkylalkoxylate fluorocarbon telomere B monoether with polyethylene glycols, ethoxylated tetramethyl decanediol.

7. The composition of claim 1 wherein said solvent system is between 80-99% by weight of the composition.

8. The composition of claim 1 wherein said superabsorbent polymer, said wetting agent and said solvent are amenable to devoid of volatile organic compounds (VOCs).

9. An anti-fog composition comprising:
a superabsorbent polymer; with the proviso that said superabsorbent polymer is not a hydroxyalkyl acrylate or hydroxymethacrylate or hydroxy alkoxyalkylacrylate or hydroxy alkoxymethacrylate;
a wetting agent;
a hydrophilic film plasticizer; and
a hydrophilic solvent system comprising water and a miscible organic solvent, in which said superabsorbent polymer and said wetting agent are dissolved; and at least one additive of a defoamer and a light stabilizer.

10. An anti-fog composition consisting of:
a superabsorbent polymer;
a wetting agent;
a hydrophilic film plasticizer;
a solvent system in which said superabsorbent polymer and said wetting agent are dissolved; and
an optional additive of at least one of a biocide, a cleaning solvent, a defoamer, a light stabilizer, and a corrosion inhibitor.

11. The composition of claim 10 wherein solvent is between 80-99% by weight of the composition.

12. A process for applying an anti-fog film to a substrate consisting of:
applying the composition of claim 1 to the substrate;
and removing excess from the surface to form the film.

13. The process of claim 12 wherein the composition optionally includes at least one additive of, a biocide, a cleaning solvent, a defoamer, a light stabilizer, and a corrosion inhibitor.

14. The process of claim 12 specifically excluding a second step beyond allowing sufficient time to apply the film.

15. The composition of claim 1 wherein said plasticizer is a hydroxyethylpyrrolidone.

16. The composition of claim 9 wherein said at least one additive further comprises a biocide and a cleaning solvent.

17. The composition of claim 10 wherein said plasticizer is a hydroxyethylpyrrolidone.

* * * * *